United States Patent
Kobayashi et al.

(10) Patent No.: US 6,206,949 B1
(45) Date of Patent: Mar. 27, 2001

(54) $NO_X$ REDUCTION USING COAL BASED REBURNING

(75) Inventors: Hisashi Kobayashi, Putnam Valley; Lawrence E. Bool, III, Hopewell Junction, both of NY (US); Michael Francis Riley, Danbury, CT (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/573,177

(22) Filed: May 19, 2000

Related U.S. Application Data

(63) Continuation-in-part of application No. 08/959,841, filed on Oct. 29, 1997, now Pat. No. 6,090,182.

(51) Int. Cl.$^7$ .................................................... C21B 5/00
(52) U.S. Cl. .................... 75/460; 75/466; 431/5
(58) Field of Search .................... 75/458, 460, 466; 266/265, 267, 225; 431/5, 2

(56) References Cited

U.S. PATENT DOCUMENTS

| | | | |
|---|---|---|---|
| 4,324,640 | * 4/1982 | Duri-Swamy | 208/8 LE |
| 4,915,619 | * 4/1990 | LaRue | 431/284 |
| 4,917,727 | 4/1990 | Saito et al. | 75/460 |
| 4,985,075 | 1/1991 | Ohno et al. | 75/460 |
| 5,120,508 | * 6/1992 | Jones | 422/171 |
| 5,266,024 | 11/1993 | Anderson | 431/11 |
| 5,451,034 | 9/1995 | Ulveling et al. | 266/182 |
| 5,522,916 | 6/1996 | Karinthi | 75/414 |
| 5,582,036 | 12/1996 | Drnevich et al. | 62/656 |
| 5,795,364 | * 8/1998 | Payne et al. | 65/158 |
| 6,048,510 | * 4/2000 | Zauderer | 423/235 |
| 6,085,674 | * 7/2000 | Ashworth | 431/4 |
| 6,090,182 | * 7/2000 | Riley | 75/460 |

FOREIGN PATENT DOCUMENTS 576869   1/1994  (EP).

OTHER PUBLICATIONS

Campbell et al., "Oxy–coal injection at Cleveland Ironworks", Iron and Steelmaking, pp 120–125, vol. 19 Dec.(1992).

Timothy et al., "Characteristics of Single Particle Coal Combustion", 19$^{th}$ Symposium on Combustion, The Combustion Institute, Dec. 1983.

Riley et al., "Effect of Direct Oxygen Injection On Combustion Of Injected Coal", Iron and Steel Society, Dec. 1998, pp 683–688.

* cited by examiner

Primary Examiner—Scott Kastler
(74) Attorney, Agent, or Firm—Stanley Ktorides

(57) ABSTRACT

A method for reducing the NOx content of combustion gases from combustion in a commercial furnace wherein hot oxygen and carbonaceous fuel such as pulverized coal react to form a fuel-rich gas phase mixture which is then used to reduce NOx to nitrogen gas.

9 Claims, 2 Drawing Sheets

$NO_x$ REDUCTION USING COAL BASED REBURNING

This is a Continuation-in-Part of prior U.S. application(s) Ser. No. 08/959841 filing date: Oct. 29, 1997, now U.S. Pat. No. 6,090,182.

TECHNICAL FIELD

This invention relates generally to combustion and, more particularly, the reduction of nitrogen oxides (NOx) emissions stemming from the combustion.

BACKGROUND ART

The combustion of fuel and oxidant to provide heat is used in a large number of commercial furnaces in such industrial applications as the generation of electricity, the production of steel and other metals, the production of glass, and the treatment of wastes. Typically the oxidant employed in the combustion process is air which contains a substantial amount of nitrogen. In the course of the combustion reaction, nitrogenous species in the fuel and nitrogen in the air are oxidized to form NOx. Other combustion gases, which typically include carbon dioxide and water vapor are also formed.

The emission of NOx from industrial and other furnaces has been shown to have a serious impact on both environmental quality and human health. The compounds cause acid rain, are a factor in the formation of ground level ozone, and have been implicated in the formation of fine particulate.

One approach to reducing NOx emissions from a combustion reaction is reburning wherein fuel is provided to the NOx-containing combustion gases to react with the NOx and form nitrogen gas. Typically the fuel employed for the reburning is methane or natural gas.

It is desirable to use a less expensive fuel such as coal or other granular carbonaceous fuel for reburning to reduce NOx emissions. However, the use of such fuels can reduce the efficiency of the reburning because longer contact times are necessary, and can result in the ash having a high carbon content causing the need for further processing steps for the ash.

Accordingly, it is an object of this invention to provide an improved method for reducing NOx emissions from a combustion reaction using reburning with a granular carbonaceous fuel.

SUMMARY OF THE INVENTION

The above and other objects, which will become apparent to those skilled in the art upon a reading of this disclosure, are attained by the present invention which is:

A method for reducing the NOx content of combustion gases from a combustion reaction comprising:

(A) combusting fuel and oxidant to generate heat and to form combustion gases comprising NOx;

(B) heating oxygen to a temperature within the range of from 1000° F. to 3000° F. to form hot oxygen;

(C) mixing the hot oxygen with granular carbonaceous fuel containing volatiles to form a mixture having a stoichiometric ratio less than 1.0, devolatizing the granular carbonaceous fuel within the mixture, and reacting hot oxygen with volatiles and granular carbonaceous fuel within the mixture to form a fuel-rich gas phase mixture containing hydrocarbon radicals; and (D) contacting the combustion gases with the fuel-rich gas phase mixture and reacting hydrocarbon radicals of the fuel-rich gas phase mixture with NOx of the combustion gases to form nitrogen gas.

As used herein the term "stoichiometric" means the ratio of oxygen molecules to fuel for combustion purposes. A stoichiometric ratio less than 1.0 means there is less oxygen present than the amount necessary to completely combust the fuel present, i.e. fuel-rich conditions.

As used herein the term "oxygen" means a gaseous fluid having an oxygen concentration of at least 30 mole percent. It may have an oxygen concentration exceeding 70 mole percent or may be commercially pure oxygen having an oxygen concentration of 99.5 mole percent or more.

As used herein the terms "nitrogen oxides" and "NOx" mean one or more of nitrous oxide ($N_2O$), nitric oxide (NO), dinitrogen trioxide ($N_2O_3$) nitrogen tetroxide ($N_2O_4$), nitrogen dioxide ($NO_2$), trinitrogen tetraoxide ($N_3O_4$) and nitrogen trioxide ($NO_3$).

As used herein the term "volatiles" means organic compounds that are evolved from solid or liquid fuels when heated. The compounds include tars, methane and other organic compounds with moderate boiling points.

As used herein the term "devolatize" means to cause volatiles to gasify from a solid or liquid.

As used herein the term "hydrocarbon radicals" means highly reactive species that are formed by dissociation of, or reaction with, hydrogen or carbon containing species. Examples of hydrocarbon radicals include NH, CH and $CH_2$.

As used herein, the term "granular" means finely divided material such as crushed or pulverized solid material or atomized liquid material.

DETAILED DESCRIPTION

Figure 1:
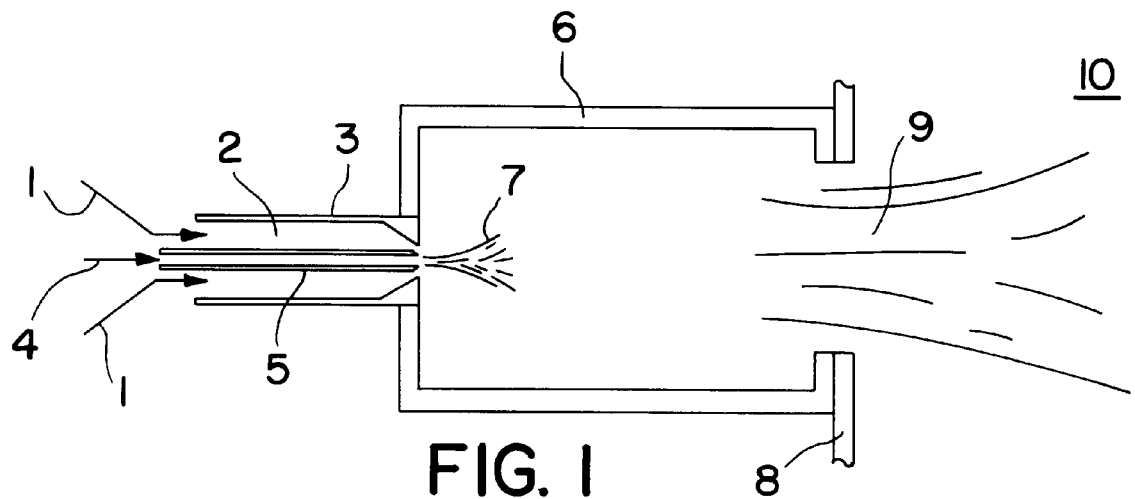
FIG. 1 is a cross-sectional representation of one preferred embodiment of the invention wherein the hot oxygen and the granular carbonaceous fuel are mixed in a gasifier compartment prior to being passed into a furnace for contact with combustion gases.

The invention will be described in detail with reference to the Drawings. Referring now to FIG. 1, oxygen 1, which has been heated to a temperature within the range of from 1000° F. to 3000° F., preferably within the range of from 2000° F. to 3000° F., is provided to the annular passage 2 of injector 3. The oxygen may be heated by any suitable means such as by heat exchange with a heat source. A particularly preferred method for heating the oxygen in the practice of this invention is the method disclosed in U.S. Pat. No. 5,266,024—Anderson.

Carbonaceous fuel 4 is provided to central passage 5 of injector 3. Any solid or liquid carbonaceous fuel may be used in the practice of this invention. Preferably carbonaceous fuel 4 comprises pulverized coal or petroleum coke.

The hot oxygen and the granular carbonaceous fuel pass through injector 3 as coaxial streams and from injector 3 into gasifier 6 wherein they mix to form mixture 7. Preferably, as illustrated in FIG. 1, the nozzles through which the hot oxygen and the carbonaceous fuel pass from injector 3 into gasifier 6 have constricted apertures thereby serving to accelerate the hot oxygen and the carbonaceous fuel, thus enhancing the mixing action within gasifier 6 and forming a more uniform mixture 7. The hot oxygen and the carbonaceous fuel are provided at rates such that the stoichiometric ratio of mixture 7 is less than 1.0 and preferably is within the range of from 0.1 to 0.6.

Heat from the hot oxygen causes some of the volatiles within the carbonaceous fuel to devolatize. Within gasifier 6 the hot oxygen reacts with the volatiles and also with carbonaceous fuel to form a fuel-rich gas phase mixture which typically comprises carbon dioxide, carbon monoxide, methane, hydrogen and other unreacted hydrocarbons. Some granular carbonaceous fuel may also be present. Owing to the heat initially brought by the hot oxygen into the combustion reaction of the hot oxygen with the volatiles and the carbonaceous fuel, as well as the heat released by the combustion reaction itself, the fuel-rich gas phase mixture also contains hydrocarbon radicals. The fuel-rich gas phase mixture containing hydrocarbon radicals is passed from gasifier 6 through furnace wall 8 as shown by stream 9 into furnace zone 10.

Within furnace zone 10 fuel and oxidant have been combusted to generate heat for industrial purposes. Examples of furnace zones useful in the practice of this invention include utility boilers, industrial furnaces and industrial boilers. The heat generating combustion reaction of fuel and oxidant within furnace zone 10 also forms combustion gases which include NOx. Within furnace zone 10 the combustion gases are contacted with the fuel-rich gas phase mixture, and hydrocarbon radicals of the fuel-rich gas phase mixture react with NOx of the combustion gases to reduce the NOx to nitrogen gas. The nitrogen gas is then passed out of the furnace with the combustion gases thus markedly reducing the NOx content of the emissions from the furnace over that which would otherwise be the case without the reburning in the furnace zone. If desired, additional oxidant, e.g. air, may be provided to the furnace zone to complete the combustion of the fuel-rich gas phase mixture prior to passage out from the furnace.

Figure 2:
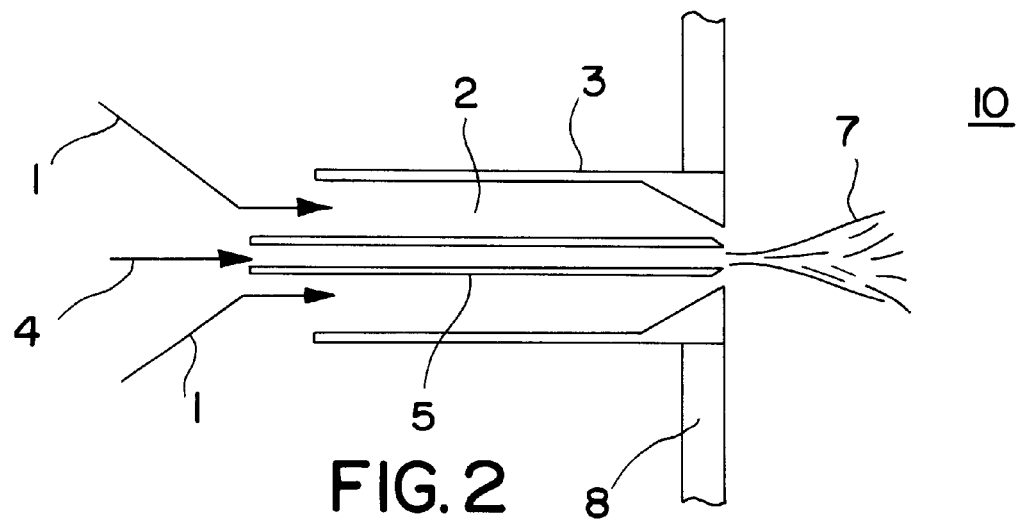
FIG. 2 is a cross-sectional representation of another preferred embodiment of the invention wherein the hot oxygen and the granular carbonaceous fuel are provided directly into a furnace for contact with combustion gases.
Figure 3:
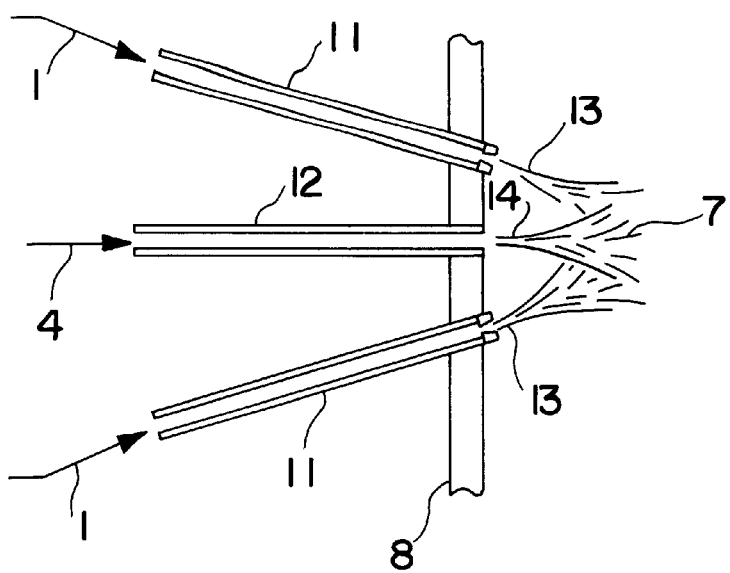
FIG. 3 is a cross-sectional representation of another preferred embodiment of the invention wherein the hot oxygen and the granular carbonaceous fuel are provided directly into a furnace using separate provision means.

FIGS. 2 and 3 illustrate other embodiments of the invention wherein a gasifier compartment is not employed. In the embodiments of the invention illustrated in FIGS. 2 and 3 the hot oxygen and the granular carbonaceous fuel are provided directly into the furnace wherein they form the substoichiometric mixture. The numerals used in FIGS. 2 and 3 are the same as those of FIG. 1 for the common elements and these common elements will not be described again in detail.

In the embodiment illustrated in FIG. 2 there is employed an injector device similar to that illustrated in FIG. 1 except that the injector device is positioned at furnace wall 8, and mixture 7 is formed within furnace zone 10. All other aspects of the embodiment of the invention illustrated in FIG. 2 are substantially the same as those previously discussed in conjunction with the embodiment illustrated in FIG. 1. As will be appreciated by those skilled in the art, the combustion of the fuel and the oxidant within the furnace zone, which is not illustrated in the Drawings, takes place at a distance from where the fuel-rich gas phase mixture is passed into or forms in the furnace zone. Generally, this combustion will take place below the level at which the fuel-rich gas phase mixture is passed into or forms in the furnace zone, and the combustion gases rise within the combustion zone to effect the contact with the fuel-rich gas phase mixture.

In the embodiment of the invention illustrated in FIG. 3 the hot oxygen and the carbonaceous fuel are provided directly into the furnace zone through separate devices. The hot oxygen is provided through one or more hot oxygen lances 11 and the carbonaceous fuel is provided through fuel lance 12. Preferably, as illustrated in FIG. 3, the hot oxygen lance(s) are oriented so as to direct the stream(s) of hot oxygen 13 injected into furnace zone 10 toward the stream of granular carbonaceous fuel 14 injected into furnace zone 10. Generally streams 13 and 14 will entrain some combustion gases prior to their mixing and forming substoichiometric mixture 7. Thereafter there is formed the fuel-rich gas phase mixture and there is effected the reduction of NOx to form nitrogen gas within furnace zone 10 in a manner similar to that previously described.

Figure 4:
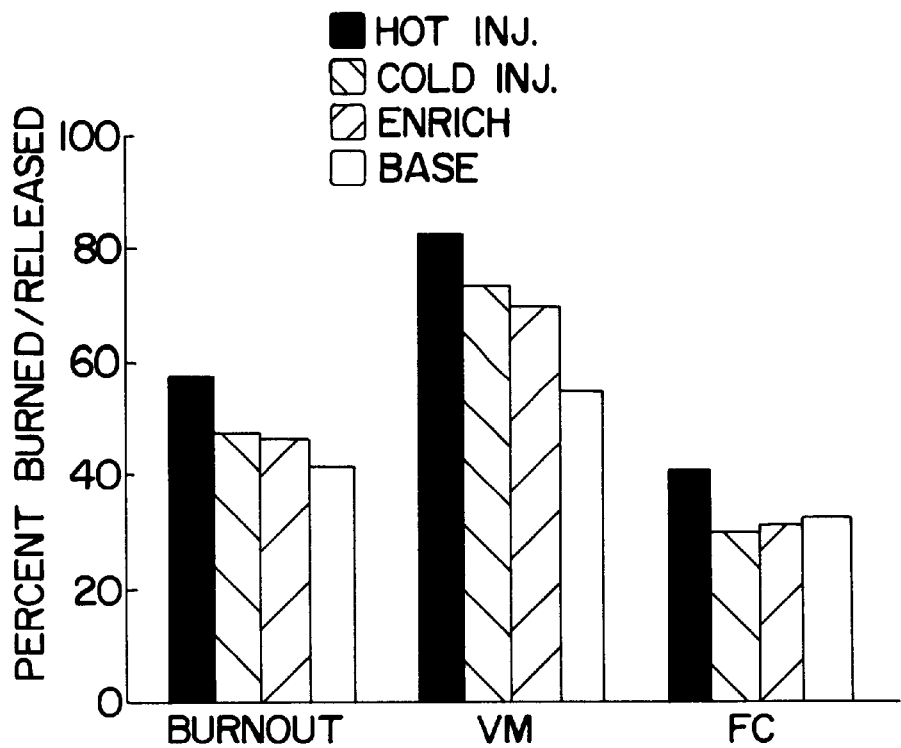
FIG. 4 is a graphical representation illustrating advantages attainable with the practice of this invention.

Applicants have found that only a small amount of heated oxygen is necessary to effectively devolatize the carbonaceous fuel which in turn enables the generation of a significant amount of hydrocarbon radicals to carry out the reburning of the invention to produce nitrogen gas. This is shown in FIG. 4 which illustrates in graphical form the results of total burnout, volatile release (VM) and fixed carbon burnout (FC) for four cases for burning pulverized coal with air in a blast air stream: (1) Base, wherein no oxygen is provided to the blast air stream, (2) Enrich, wherein oxygen is provided at ambient temperature upstream of the blast air heater, (3) Cold Inj., wherein oxygen is provided into the blast air stream at ambient temperature, and (4) Hot Inj., wherein heated oxygen was used. In each case the fuel was high volatile pulverized coal of the kind typically used in commercial blast furnace operations and having the analysis shown in Table 1. The fuel was provided into the blast air stream at a flowrate of 9.5 kg/hr.

TABLE 1

| Coal Analysis | | | |
|---|---|---|---|
| Proximate Analysis | Weight Percent | Ultimate Analysis | Weight Percent |
| Moisture | 1.19 | Carbon | 77.5 |
| Ash | 7.13 | Hydrogen | 5.1 |
| Volatile Matter | 34.94 | Nitrogen | 1.4 |
| Fixed Carbon | 56.75 | Sulfur | 1.0 |
| | | Oxygen | 6.7 |

Char was collected by quenching with water. The fraction of total coal burnout, T, was determined by chemical analysis of the ash content of the original coal, $A_0$, and the ash content of the collected char, $A_1$, according to the relation $$T = \frac{(A_1 - A_0)}{A_1(1 - A_0)}$$

The release of volatiles, R, and the combustion of fixed carbon, C, were determined from the chemical analyses of ash, volatile matter ($V_0$) and fixed carbon ($F_0$) in the coal, and ash, volatile matter ($V_1$), and fixed carbon ($F_1$) in the char, according to the relations $$R = 1 - \frac{V_1 A_0}{V_0 A_1}$$

$$C = 1 - \frac{F_1 A_0}{F_0 A_1}$$

When oxygen was used, 3.7 Nm$^3$/hr. of the air flow was replaced with oxygen. For the enrichment test, the air and oxygen were mixed at ambient temperature and the mixture heated to 900° C., so that the total gas flow rate, velocity and temperature were the same as the base case. For the ambient injection test, 93.7 Nm³/hr of air was used for the blast at 900° C., and 3.7 Nm³/hr of oxygen was injected through the oxygen lance. The total gas flow rate was the same as in the base case, while the temperature was lower since the oxygen addition was not heated. The oxygen for the ambient injection test had a purity of about 99.99 percent. For the hot injection test, the oxygen had an oxygen concentration of about 80 mole percent and a temperature of 1565° C.

FIG. 4 compares the total burnout, volatile release, and fixed carbon burnout for each case for coal injection rates of 9.5 kg/hr. As can be seen from the results reported in FIG. 4, the use of a small amount of oxygen significantly improves the volatile release compared to that attainable with only air as the oxidant, and the use of hot oxygen shows even higher performance resulting in even more volatiles available to generate even more hydrocarbon radicals for the reburning.

Now by the use of this invention one may effectively use coal or other inexpensive fuel for reburning to reduce NOx emissions from a commercial furnace. Although the invention has been described in detail with reference to certain preferred embodiments, those skilled in the art will recognize that there are other embodiments of the invention within the spirit and the scope of the claims.

What is claimed is:

1. A method for reducing the NOx content of combustion gases from a combustion reaction comprising:

(A) combusting fuel and oxidant to generate heat and to form combustion gases comprising NOx;

(B) heating oxygen to a temperature within the range of from 1000° F. to 3000° F. to form hot oxygen;

(C) mixing the hot oxygen with granular carbonaceous fuel containing volatiles to form a mixture having a stoichiometric ratio less than 1.0, devolatizing the granular carbonaceous fuel within the mixture, and reacting hot oxygen with volatiles and granular carbonaceous fuel within the mixture to form a fuel-rich gas phase mixture containing hydrocarbon radicals; and (D) contacting the combustion gases with the fuel-rich gas phase mixture and reacting hydrocarbon radicals of the fuel-rich gas phase mixture with NOx of the combustion gases to form nitrogen gas.

2. The method of claim 1 wherein the hot oxygen has a temperature within the range of from 2000° F. to 3000° F.

3. The method of claim 1 wherein the granular carbonaceous fuel comprises coal.

4. The method of claim 1 wherein the mixture has a stoichiometric ratio within the range of from 0.1 to 0.6.

5. The method of claim 1 wherein the hot oxygen has an oxygen concentration of at least 70 mole percent.

6. The method of claim 1 wherein the hot oxygen and the granular carbonaceous fuel are passed into a gasifier, and the fuel-rich gas phase mixture is passed from the gasifier into a furnace zone wherein it contacts the combustion gases.

7. The method of claim 1 wherein the hot oxygen and the granular carbonaceous fuel are passed into a furnace zone which also contains the combustion gases comprising NOx.

8. The method of claim 1 wherein the hot oxygen and the granular carbonaceous fuel are accelerated prior to forming the mixture having a stoichiometric ratio less than 1.0.

9. The method of claim 1 wherein some combustion gases are entrained into the hot oxygen prior to the mixing of the hot oxygen with the granular carbonaceous fuel.

* * * * *